United States Patent
Cha et al.

(10) Patent No.: US 8,200,625 B2
(45) Date of Patent: Jun. 12, 2012

(54) MOBILE DEVICE AND DATA SYNCHRONIZATION METHOD THEREOF

(75) Inventors: Hyun Seok Cha, Seoul (KR); Young Jun Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 451 days.

(21) Appl. No.: 12/287,617

(22) Filed: Oct. 10, 2008

(65) Prior Publication Data

US 2009/0132606 A1    May 21, 2009

(30) Foreign Application Priority Data

Nov. 20, 2007  (KR) ........................ 10-2007-0118493

(51) Int. Cl.
  *G06F 17/30*    (2006.01)
(52) U.S. Cl. ........................................ 707/617; 707/621
(58) Field of Classification Search ........... 707/610–625
   See application file for complete search history.

(56) References Cited

U.S. PATENT DOCUMENTS

| 7,529,780 B1 * | 5/2009 | Braginsky et al. ...... 707/999.008 |
| 7,720,890 B2 * | 5/2010 | Rao et al. ...................... 707/821 |
| 2006/0136472 A1 * | 6/2006 | Jujjuri et al. ................. 707/102 |
| 2006/0190500 A1 * | 8/2006 | Rao et al. ...................... 707/203 |

* cited by examiner

*Primary Examiner* — Khanh Pham

(57) ABSTRACT

A data synchronization method for a mobile device is provided for effectively synchronizing metadata between a database and a file system of the mobile device. A metadata synchronization method of the present invention includes resetting, when an external storage is connected, an effective value of metadata and a global variable; comparing, when the external storage is disconnected, each file information item managed in a file system with each metadata item managed in a database; replacing, when a file information item includes a metadata item, the effective value of the metadata item with a value of the global variable; and deleting metadata items with an effective value not identical to the value of the global variable. The data synchronization method of the present invention facilitates synchronization of the metadata and file information of the data stored in the external storage device.

20 Claims, 3 Drawing Sheets

MOBILE DEVICE AND DATA SYNCHRONIZATION METHOD THEREOF

CROSS-REFERENCE TO RELATED APPLICATION(S) AND CLAIM OF PRIORITY

The present application claims priority to an application entitled "MOBILE DEVICE AND DATA SYNCHRONIZATION METHOD THEREOF" filed in the Korean Intellectual Property Office on Nov. 20, 2007 and assigned Serial No. 2007-0118493, the contents of which are incorporated herein by reference.

TECHNICAL FIELD OF THE INVENTION

The present invention relates to a mobile device and, in particular, to a data synchronization method for a mobile device that is capable of effectively synchronizing metadata between a database and a file system of the mobile device.

BACKGROUND OF THE INVENTION

With the advance of data communication technologies, mobile phones have evolved to multifunctional portable devices by integrating various functional modules such as camera, music player, and digital broadcast receiver.

As more and more functions are integrated into a mobile phone, the mobile phone has had to deal with and store a large and wide variety of data. For this reason, recent mobile phones are required to secure large storage space. In order to expand the storage capacity of a mobile phone, various external storage devices such as MultiMediaCard (MMC) and universal serial bus (USB) memory. Using such an external storage device, the data stored in the mobile phone can be copied to and even modified in another device (e.g., personal computer).

In a case that the data are stored in the MMC or USB memory, the mobile phone should synchronize metadata of the data between a database and a file system of the mobile phone whenever the MMC or USB memory is attached to and/or detached from the mobile phone.

In order to synchronize the metadata managed in a database, a conventional data synchronization method initializes the database managing the metadata and restructures the database with the metadata (i.e., the file information managed in the file system). However, the conventional data synchronization method has a shortcoming that it takes so long time to synchronize the metadata between the database and the file system of the mobile phone.

SUMMARY OF THE INVENTION

To address the above-discussed deficiencies of the prior art, it is a primary object to provide a mobile device and data synchronization method of the mobile device that is capable of synchronizing metadata of data stored in an external storage device between a database and a file system of the mobile device.

In accordance with an exemplary embodiment of the present invention, a metadata synchronization method for a mobile device includes resetting, when an external storage is connected, effective values of metadata and a global variable; comparing, when the external storage is disconnected, each file information item managed in a file system with each metadata item managed in a database; replacing, when the file information item includes the meta data item, the effective value of the metadata item with a value of the global variable; and deleting metadata items of which effective values are not identical with the value of the global variable.

In accordance with another exemplary embodiment of the present invention, a mobile device includes a storage unit which has a file system for storing file information items of data and metadata items with effective values; and a control unit which resets, when an external storage is connected, effective values of metadata and a global variable; compares, when the external storage is disconnected, each file information item managed in a file system with each metadata item managed in a database; replaces, when the file information item includes the meta data item, the effective value of the metadata item with a value of the global variable; and deletes metadata items of which effective values are not identical with the value of the global variable.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
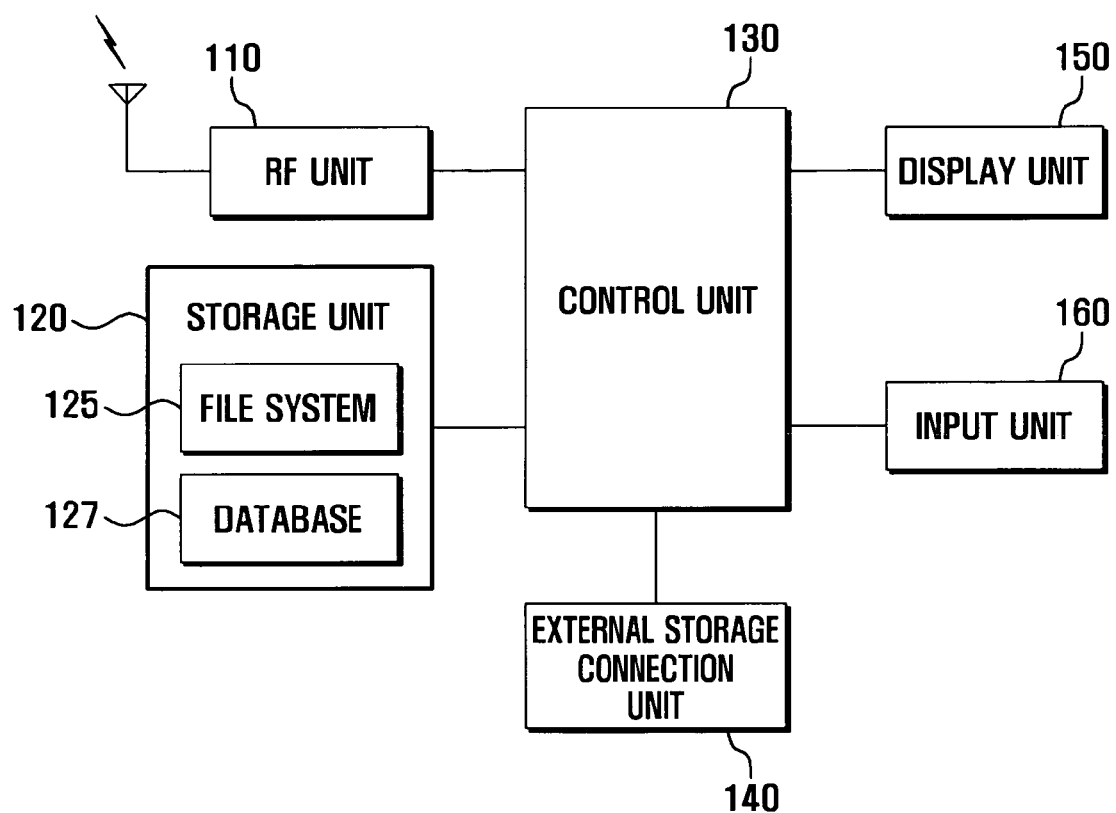
FIG. 1 is a block diagram illustrating a configuration of a mobile device according to an exemplary embodiment of the present invention.
Figure 2:
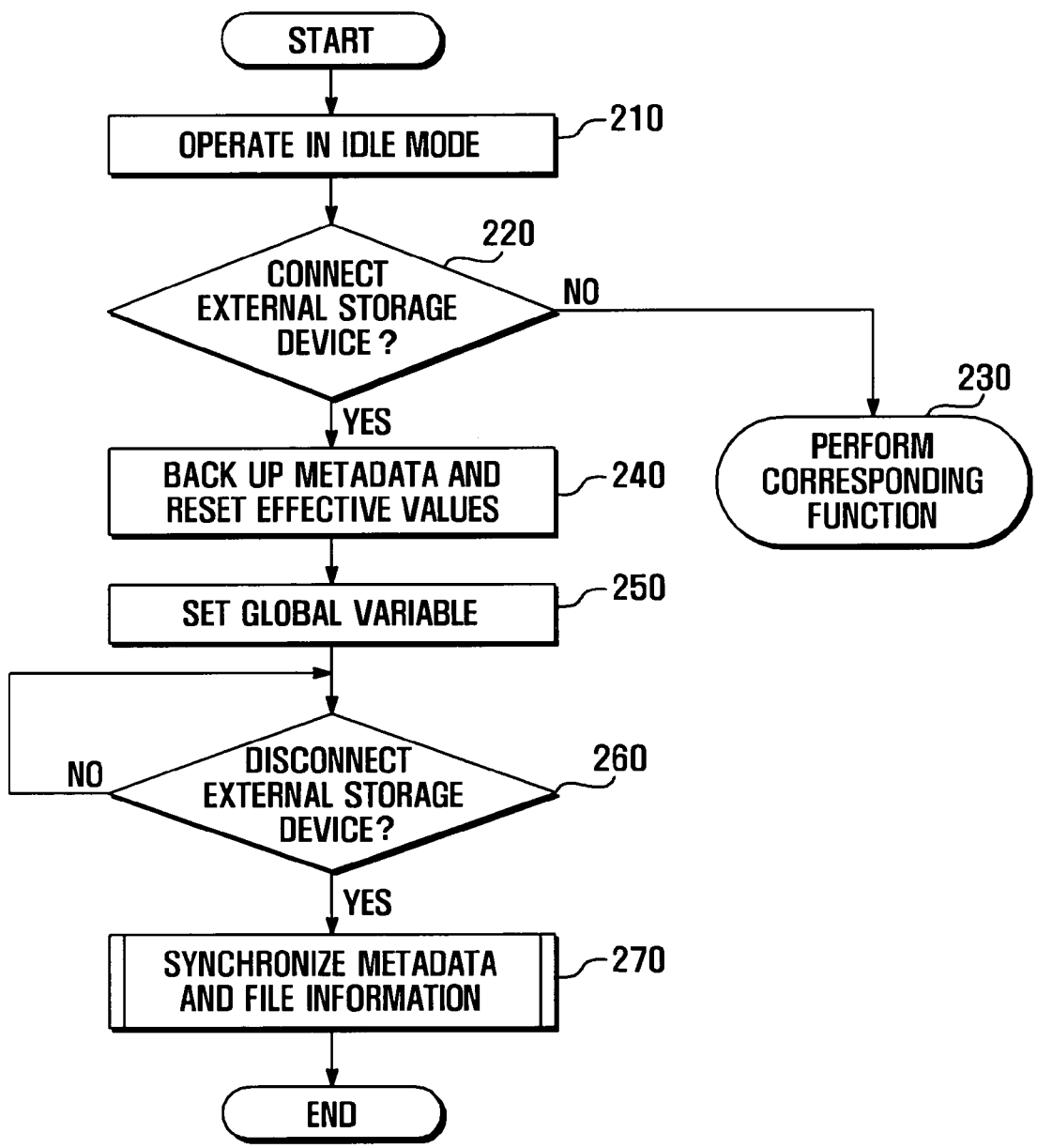
FIG. 2 is a flowchart illustrating a data synchronization method according to an exemplary embodiment of the present invention.
Figure 3:
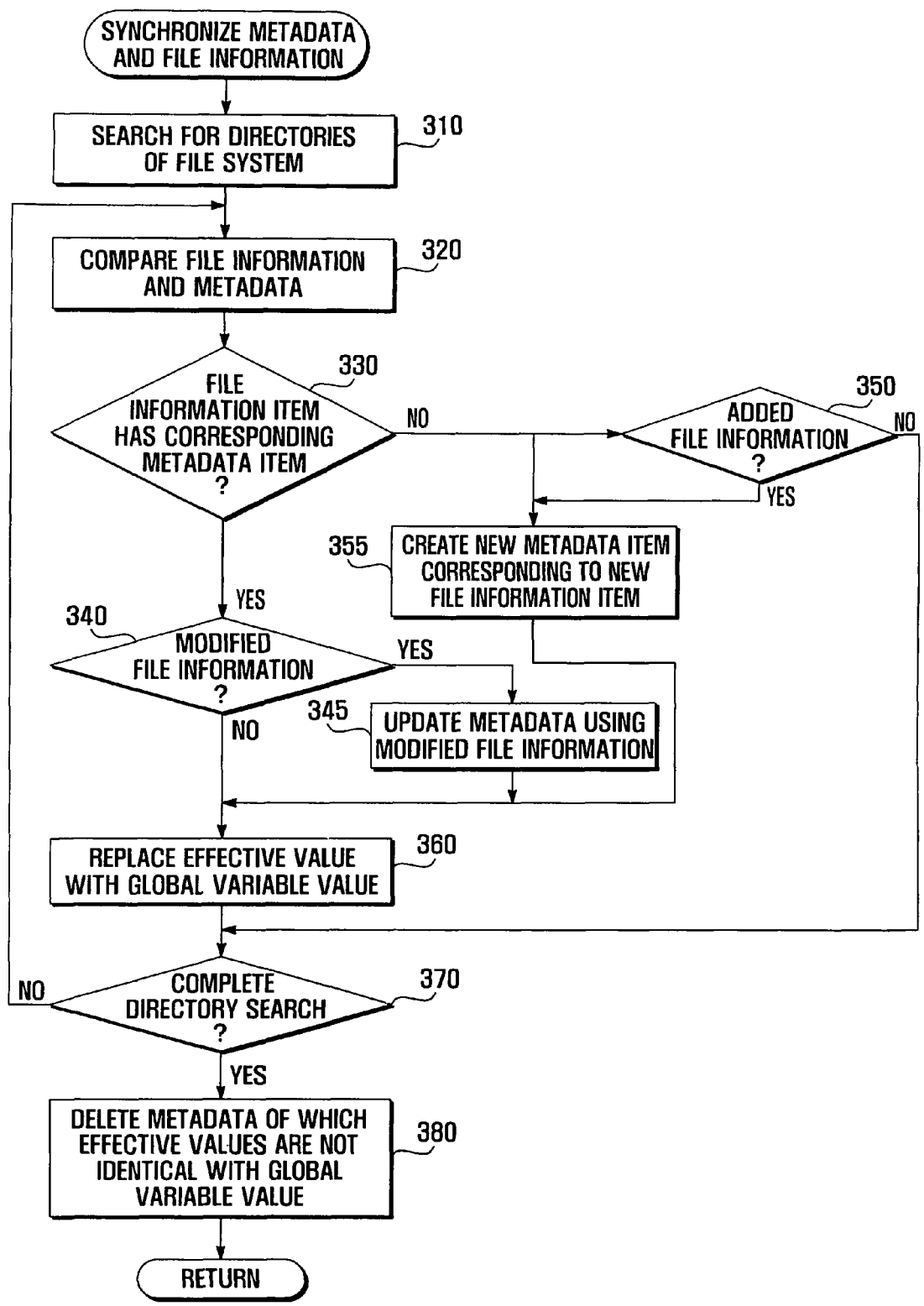
FIG. 3 is a flowchart illustrating a metadata synchronization procedure of the data synchronization method of FIG. 2.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile device.

In the following description, the term "file" denotes an logical entity that can be accessed, used, or manipulated as a container for containing various types of data including audio data, photo data, document data, communication data (e.g., log information and incoming and outgoing text messages), phone number data, etc.

The term "file system" denotes a mechanism for naming, storing, retrieving, and locating files, and defining storage paths of the files in a directory service.

The term "database" denotes a system for facilitating modification, addition, and deletion of data; describing data, accumulating data in a specific data structure; retrieving and updating the data using a specific database language; and providing data security service.

The term "file information" denotes information on the file stored within the file system, including data name, data description, data size, data type, and data location in the file system.

The term "metadata" denotes information associated with the data that is provided to a user and stored by means of the database. The metadata includes data name, data size, stored date, data type, and location stored in the file system. The metadata is provided with an effective value field indicating effective value of the data. The effective value can be converted to a global variable as a result of comparison the file information of the file system and the metadata of the database.

The term "global variable" denotes a value set whenever the mobile device is connected to an external storage device. The global variable can be expressed as a number of connection times of the mobile device to the external storage device or a mark indicating whether the data can be modified by means of the external device. The global variable is used for synchronizing the file information and metadata and can be set to 0 or 1.

FIG. 1 is a block diagram illustrating a configuration of a mobile device according to an exemplary embodiment of the present invention.

Referring to FIG. 1, the mobile device includes a radio frequency (RF) unit 110, a storage unit 120, a control unit 130, an external storage connection unit 120, a display unit 150, and an input unit 160.

The RF unit 110 is responsible for radio communication with a base station. The RF unit 110 includes a duplexer for separating transmission and reception of radio signals, a transmitter for up-converting the transmission signal frequency, and a receiver for down-converting the received signal frequency.

The storage unit 120 stores application programs for executing additional functions of the mobile device and user data created while the mobile terminal operates and received from outside. Particularly in this embodiment, the storage unit 120 includes a file system 125 and a database 127.

The file system 125 stores and manages all of the data used in the mobile device. The file system 125 also stores file information describing the respective data. The file information of each data includes data name, data size, location, created date, and modification information.

The database 127 stores metadata of the respective data stored in the file system 125. The metadata are data about the data stored in the file system 125. Each item of metadata includes name, size, physical location, creation data, and modification information of the data. Each item of metadata is provided with an effective value field. The effective value field contains an effective value which is used for determining whether the file system 125 and the data base 127 are in synchronization when synchronizing the metadata.

The control unit 130 controls general operations and states of the internal units of the mobile device. Particularly when an external storage medium is connected through the external storage connection unit 140, the control unit 130 detects the connection and performs backup of the metadata of the database 127 and resets the effective value of the effective value field of each metadata item. The control unit 130 sets a global variable upon detection of the connection of an external storage medium and synchronizes the metadata of the database 127 and the file information of the file system 125 upon detection of disconnection of the external storage medium using the global variable and the effective value.

The external storage connection unit 140 is implemented in the form of a slot for receiving storage media cards such as MMC, Secure Digital (SD) card, micro SD card, T-Flash card, and mini SD, and/or a USB port for connecting the mobile device to an external device (e.g., computer or other mobile device) through a USB cable. In this embodiment, the external storage connection unit 140 is assumed as a USB port.

The display unit 150 displays various information associated with the operation states of the mobile device. The display unit can be implemented with a liquid crystal display (LCD). In this case, the display unit is provided with a controller, graphic memory for storing video data, and LCD devices. Particularly when the display unit 150 is implemented with a touchscreen-enabled LCD, it can act as a part of the input unit 160.

The input unit 160 is provided with a plurality of alphanumeric keys for inputting alphanumeric data and functional keys for executing various functions provided by the mobile device. The input unit 160 generates key signals and transmits-the key signal to the control unit 130. The input unit 160 can be implemented with at least one of keypad and a touchpad.

With this configuration, when a USB memory is inserted within the external storage connection unit 140, the control unit 130 performs backup of the metadata of the database 127, resets the effective value of each item of the metadata, and sets the global variable. Also, when the disconnection of the USB memory is detected, the control unit 130 compares the metadata and file information. If the metadata includes the file information, the control unit 130 resets the effective value with a value of the global variable and deletes the metadata of which effective value is not identical to the global variable.

FIG. 2 is a flowchart illustrating a data synchronization method according to an exemplary embodiment of the present invention.

Referring to FIG. 2, the mobile device operates in an idle mode (S210). While operating in the idle mode, the mobile device detects an event and determines whether the event is a connection of an external storage device to the external storage connection unit 140 (S220). If the event is not a connection of an external storage device, the control unit performs a function corresponding to the event (S230). In this case, the function can be a voice call, text messaging, or the like.

If the detected event is a connection of an external storage device, the control unit 130 backs up the metadata stored in the data base 127 and resets the effective value contained in the effective value fields of the metadata (S240). In this embodiment, the effective value is reset to 0.

Next, the control unit 130 sets a global variable value according to the connection of the external storage device (S250). The global variable value can be a count value indicating a number of the connection times of the external storage device or a value indicating accessibility to the file system 125 of the mobile device. In this embodiment, the global variable is set to 1 as a default value.

After setting the global variable, the control unit 130 determines whether a disconnection of the external storage device is detected (S260). For example, if a USB connection of the external storage device to the external storage connection unit 140 is released, the control unit 130 regards the release as the disconnection event.

If a disconnection of the external storage device is detected, the control unit 130 synchronizes the metadata of the database 127 and the file information of the file system 125 (S270). The metadata synchronization procedure is described hereinafter with reference to FIG. 3.

FIG. 3 is a flowchart illustrating a metadata synchronization procedure of the data synchronization method of FIG. 2.

Referring to FIG. 3, if a disconnection of the external storage device is detected, the control unit 130 searches for the directories of the file system 125 (S310). During the directory search, the control unit 130 compares each file information item stored in the file system 125 with each metadata item stored in the database 127 (S320) and determines whether each file information item has a corresponding metadata item in the database 127 (S330).

If the file information item has a corresponding metadata item, the control unit 130 determines whether the file information item is modified (S340). For example, in a case that additional data is added to the original data or the data is resized in the external storage device, the control unit 130 modifies the file information according to the modification of the original data. In order to synchronize the file information and the metadata, the control unit 130 checks the modification of the file information item and compares the modified file information item with the corresponding metadata item.

If the file information is modified, the control unit 130 updates the metadata item using the modified file information (S345). That is, if the file information item of a specific data includes a newly added information property, the control unit 130 adds the newly added information property to the corresponding metadata item stored in the database 127. After updating the metadata item, the control unit 130 resets the effective value of the metadata item with the value of the global variable in order to mark that a metadata item of the database 127 corresponds with the file information item of the file system 125 (S360). That is, the effective value set to 0 is replaced by the global variable value 1 which is set at step S250 of FIG. 2.

If it is determined that the file information item does not have a corresponding metadata item at step S330, the control unit 130 determines whether the file information is newly added (S350). If the file information is newly added, the control unit (130) creates a metadata item corresponding to the newly added file information item (S355). That is, a new data item is added to the external storage device, the control unit 130 creates a new file information item about the data item. Since the new file information item has no corresponding metadata item, the control unit 130 creates a metadata item corresponding to the new file information during the synchronization procedure. After creating the metadata item about the new data, the control unit sets the effective value of the new metadata item with the value of the global variable (S360). That is, the effective value of the new metadata item set to 1 which is global variable value set at step S250 of FIG. 2.

After setting the effective value of the metadata item, the control unit 130 determines whether the directory search of the file system 125 has been completed (S370). That is, the control unit 130 compares the file information and the metadata by data item and determines whether there remains any data item of which file information and metadata are not compared with each other. If the directory search has not completed, the control unit 130 repeats step S320 for processing the remaining metadata.

If the directory search has completed, the control unit 130 deletes metadata items of which effective values are not identical to the global variable value (S380). For example, if a data item is deleted from the external storage device such that the file information about the data item is discarded, the metadata item corresponding to the deleted data item has no file information to compare. Accordingly, the metadata item has an effective value set to 0. The maintenance of effective value 0 means that there is no data item linked to the metadata item, such that the control unit 130 deletes the metadata item having no corresponding data item.

Although the data synchronization method is described in association with a USB connection, the present invention is not limited thereto. For example, the data synchronization method can be applied for synchronizing data of a mobile device using an MMC as the external storage device. In this case, the mobile device resets the effective value of the metadata stored in the database 127 and updates the file information stored in the file system 125, upon detection of the MMC. Next, the control unit 130 compares each file information item stored in the file system 125 and each metadata item stored in the database 127. If the file information item includes the metadata item, the control unit 130 sets the effective value of the metadata item to the value of the global variable. Consequently, the control unit 130 deletes the metadata item of which effective value differs from the value of the global variable. In this manner, the control unit 130 synchronizes the metadata items managed in the mobile device with the file information items of the data items contained in the MMC. Even when the MMC contains data items that are modified or newly added by another device, the control unit 130 can synchronize the metadata and the file information effectively.

As described above, the data synchronization method of the present invention can effectively synchronize metadata stored in a database with file information stored in a file system.

Also, the data synchronization method of the present invention can ensure metadata integrity even when the data linked to the metadata are stored in an external storage device.

Also, the data synchronization method of the present invention can reduce synchronization latency by updating only the modified metadata items rather than overwriting the entire file information on the metadata.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A metadata synchronization method for a mobile device, comprising:
    resetting, when an external storage is connected, an effective value of each of a plurality of metadata items and a global variable;
    comparing, when the external storage is disconnected, each one of a plurality of file information items managed in a file system of the mobile device with each metadata item managed in a database of the mobile device;
    replacing, when the one file information item includes an associated one metadata item, the effective value of the one metadata item with a value of the global variable; and
    deleting metadata items having an effective value not identical to the value of the global variable.

2. The metadata synchronization method of claim 1, wherein replacing the effective value comprises:
    determining, if the one metadata item includes the file information item, whether the one file information item is modified; and
    updating, if the one file information item is modified, the metadata with the modified one file information item.

3. The metadata synchronization method of claim 1, wherein comparing each file information item with each metadata item comprises:
   creating, if the file information is newly added one, a new metadata item corresponding to the newly added file information item; and
   setting the effective value of the new metadata item to the value of the global variable.

4. The metadata synchronization method of claim 2, wherein replacing the effective value further comprises maintaining, if the one metadata item does not include a file information item, the effective value of the one metadata item.

5. The metadata synchronization method claim 1, wherein setting the effective value of the global variable comprises setting the effective value of the global variable to a logic '1' value, and resetting the effective value of the global variable comprises setting the effective value of the global variable to a logic '0' value.

6. A mobile device comprising:
   a storage unit which has a file system for storing a plurality of file information items of data and a plurality of metadata items with an effective value; and
   a control unit which resets, when an external storage is connected, the effective value of each of the plurality of metadata items and a global variable; compares, when the external storage is disconnected, each of the plurality of file information items managed in a file system of the storage unit with the each metadata item managed in a database of the storage unit; replaces, when the each file information item includes an associated metadata item, the effective value of the each metadata item with a value of the global variable; and deletes metadata items having an effective value not identical to the value of the global variable.

7. The mobile device of claim 6, wherein the control unit determines, if the one metadata item includes the one file information item, whether the one file information item is modified, and updates, if the one file information item is modified, the one metadata item with the modified one file information item.

8. The mobile device of claim 7, wherein the control unit creates, if the one file information is newly added one, a new metadata item corresponding to the newly added one file information item, and sets the effective value of the new metadata item to the value of the global variable.

9. The mobile device of claim 8, wherein the control unit maintains, if the one metadata item does not include a file information item, the effective value of the one metadata item.

10. The mobile device of claim 6, wherein the global variable comprises a logic '1' value and a logic '0' value.

11. A metadata synchronization method for a mobile device, comprising:
   upon a connection to an external storage device:
      resetting an effective value of each one of a plurality of metadata items stored in a database of the mobile device to a reset value, and
      setting a global variable value based on the connection of the external storage device; and
   upon a disconnection of the external storage device:
      if one of a plurality of file information items in a file system of the mobile device has a corresponding one metadata item stored in the database of the mobile device, determining if the one file information item has been modified,
      if the one file information item has been modified, updating the one metadata item corresponding to the modified file information item, and
      if the one file information item has not been modified, replacing the effective value of the one metadata item corresponding to the one file information item with the global variable value.

12. The method of claim 11 further comprising:
   if the one file information item in the file system of the mobile device does not have a corresponding metadata item stored in the database of the mobile device, creating a new metadata item to correspond with the one file information item and setting the effective value of the new metadata item to the global variable value.

13. The method of claim 11 further comprising:
   if the one metadata item stored in the database of the mobile device does not have a corresponding file information item, maintaining the current effective value of the one metadata item.

14. The method of claim 11 further comprising:
   deleting metadata items from the database of the mobile device which do not have an effective value identical to the global variable value.

15. The method of claim 11, wherein setting the effective value of the global variable comprises setting the effective value of the global variable to a logic '1' value, and resetting the effective value of the global variable comprises setting the effective value of the global variable to a logic '0' value.

16. A mobile device comprising:
   a storage unit which has a file system for storing a plurality of file information items and a database for storing a plurality of metadata items with an effective value; and
   a control unit which resets, when an external storage is connected, the effective value of each one of the plurality of metadata items to a reset value and a global variable; compares, when the external storage is disconnected, each one of the plurality of file information items stored in the file system with each one metadata item stored in the database; replaces, when the one file information item includes an associated metadata item, the effective value of the one metadata item with a value of the global variable; and creates, when the one file information item does not include an associated metadata item, a new metadata item corresponding to the filed information item and having an effective value equal to the global variable.

17. The mobile device of claim 16, wherein if the one file information item is modified, the control unit updates the one metadata corresponding to the modified one file information item with the modified one file information item.

18. The mobile device of claim 16, wherein the control unit maintains, if the one metadata item does not have a corresponding file information item, the current effective value of the one metadata item.

19. The mobile device of claim 16, wherein the control unit deletes any metadata item from the database of the mobile device which does not have an effective value identical to the global variable value.

20. The mobile device of claim 16, wherein the global variable comprises a logic '1' value and a logic '0' value.

* * * * *